June 10, 1941.  M. FREI  2,245,333

MOTOR TRUCK HAVING RADIAL AXLE GUIDING STRUCTURES

Filed Dec. 23, 1938

Inventor:
Max Frei
By Sommers & Young
Att'ys

Patented June 10, 1941

2,245,333

UNITED STATES PATENT OFFICE 2,245,333

MOTOR TRUCK HAVING RADIAL AXLE GUIDING STRUCTURES

Max Frei, Neuhausen, Switzerland, assignor to the firm Schweizerische Industrie-Gesellschaft, Neuhausen, Switzerland Application December 23, 1938, Serial No. 247,505
In Switzerland May 3, 1938

4 Claims. (Cl. 105—168)

This invention relates to motor trucks having radial axle guiding structures with positively operating adjusting means.

Such motor trucks of usual construction are either provided with a main frame transmitting the loading to two associated radially extending axle supporting structures or the arrangement is such that the main frame transmits the loading directly to the axle boxes and the adjusting means engage with the axle boxes directly for effecting the radial adjustment. The former construction results ordinarily in a somewhat heavy and expensive construction, whereas the latter requires a plurality of articulated constituent parts being subject to relatively considerable wear.

The present invention is concerned with a motor truck having radial axle guiding structures with positively operating adjusting means wherein, according to the invention, both radial axle guiding structures, at least one of which is formed by a housing including a motor and an associated gearing, are pivotally connected at their outer ends with the truck frame, and are radially adjusted by a common adjusting device engaging with the inner ends of said guiding structures, the whole arrangement being such, that the radial axle guiding structures transmit tensions and thrusts exclusively, without being influenced by vertical loads.

The transmission of tensions and thrusts is, advantageously, effected by means of triangular links which are pivoted to the terminal cross members of the main frame so as to be rockable about a horizontal axis and are articulated to the motor housings or frame-like radius bars respectively to be freely movable in the vertical direction. These connections provide the fulcrums for the radial axle guiding structures formed by the motor housings or the frame-like radius bars respectively and are not influenced by vertical loads. The transmission of the loading from the truck frame to the axle boxes is, advantageously, effected by stirrups which are suspended from the main frame by means of intervening springs and bear against cylindrical axle box casings or rollers and on the underside of which the axle boxes roll while the axles swing out laterally.

Embodiments of the invention are shown in the accompanying drawing, by way of example only, in which—

Figure 1:
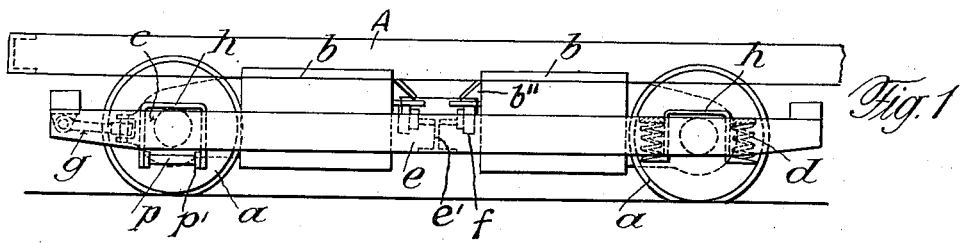
Figure 2:
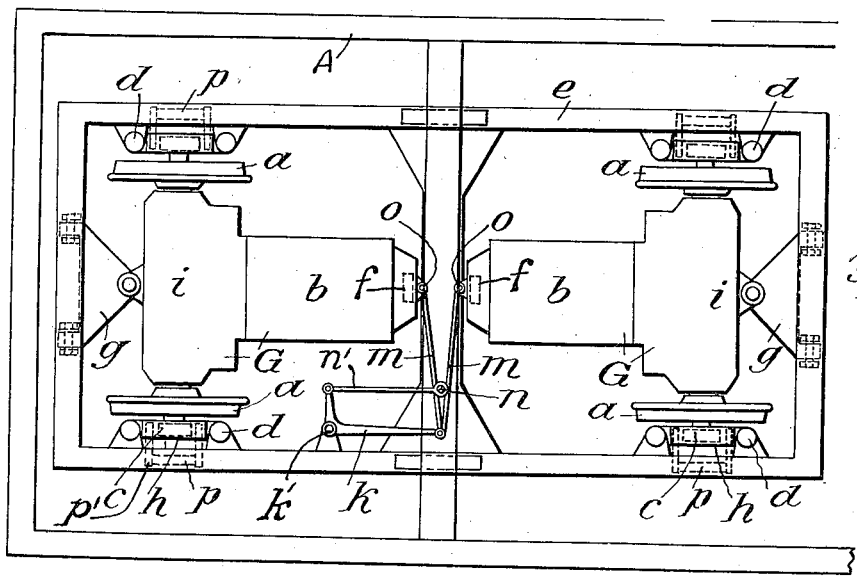
Figure 3:
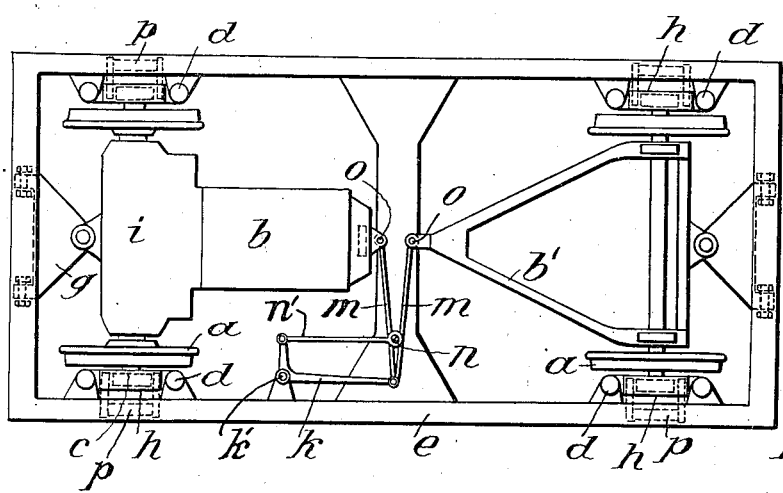

Fig. 1 shows an elevation of a first embodiment;
Fig. 2 is a top plan view of Fig. 1, and Fig. 3 is a top plan view of a second embodiment.

In the embodiment shown in Figs. 1 and 2 which is provided with two motor driven, radially spaced, transversely extending axles, the wheel-and-axle structures are each designated by $a$ and are driven by motors $b$. The wheel-and-axle structures support the motors, and the gearings $i$ associated therewith, by means of projecting bearings. The motor and the associated gearing are so united that the common housing G thereof forms the radial axle guiding structure. The casing of the gearing $i$ is connected with the truck frame $e$ by means of triangular links $g$ which transmit longitudinally and transversely acting forces, but no vertically acting forces. The total weight imposed by the car on the heavy load carrier transom $e'$ through the main frame A by means of a truck and body interlock known per se is transmitted to the wheel-and-axle structures $a$ by spring supporting suspension stirrups $h$ which are guided by the frame $e$ and bear against axle boxes $c$ of cylindrical shape by means of their yokes.

As the car rounds a curve the axle boxes roll on the underside of the stirrups $h$ while the truck moves out of its central position relatively to the main frame, whereas the truck and body interlock being connected to the main and truck frames remains stationary. Due to the axle boxes thus shifting away from the midpoint of the stirrups, the coil springs $d$ interposed between the lower flanged ends of the stirrups and the truck frame $e$ become unequally loaded, so that the stirrups then tend to assume an inclined position on the axle boxes. For preventing this, a paralleling device $p$ is intercalated between each stirrup and the truck frame, which devices maintain the yokes of the stirrups in horizontal position by means of links $p'$. The links are fixed at one end to a roll-shaped body member $p$ of the paralleling device mounted on the truck frame for rocking about its horizontally extending axis, and are pivotally connected at their other ends to the oppositely disposed legs of the stirrups $h$, thereby retaining the yokes of the latter in horizontal position and thus within the plane of the truck frame even if the loading on the stirrups is asymmetrical. The radial adjustment, that is, the rocking movement of the wheels and axle structures or radial axle guiding structures G is effected by means of an adjusting device $k$ known per se working on the principle of utilizing the relative rocking movement of a vehicle body and a pivotal truck for the purpose of rockingly adjusting the axles of the vehicle relatively to the truck frame in accordance with the rocking movements of the truck relatively to the vehicle body. This device includes a bell crank lever $k$ which is pivotally connected to the movable truck frame $e$, at $k'$, so that one arm thereof extends longitudinally and the other transversely of this frame. The longitudinally directed arm is connected to the ends of the motor housings or radial axle guiding structures G supported by the central transom $e'$ of the frame $e$, by means of rollers $f$ rotatably mounted on this transom, through links $m$ pivoted to brackets $b''$ on the housings G at $o$. The transversely directed arm of the lever $k$ is connected to a stud $n$ fixed on the vehicle body by means of a connecting rod $n'$.

During the movement of the truck relatively to the car body about the truck and body interlock, while the vehicle traverses the curve, the fulcrum represented by the stud $n$ fixed to the car body moves substantially longitudinally relatively to the truck frame for the reason that the stud $n$ is located in the transverse axis of the frame $e$ through the truck center and is thus eccentric thereto. In order to permit the movements described to be realized, the truck and body interlock must necessarily act as a fulcrum arranged centrally of the transom $e'$ and thus of the truck. The movements of the eccentric stud $n$ are then transmitted to the lever $k$ so as to cause the end of the longitudinally directed arm thereof and thereby the fulcrums $o$ to move in the transverse direction. It is obvious that the lengths of the arms of the lever $k$ as well as all other main dimensions of the truck must be chosen in accordance with the distance between the centers of the trucks of the vehicle with a view to obtaining geometrically correct adjustments of the wheel and axle structures $a$ about the respective truck centers in every curve of the track. Transverse movements of the car body relative to the truck frame, such as oscillations or vibrations that may be set up in the car body or the frame A from side shocks or the like have no detrimental influence since the corresponding movements of the stud $n$ have no effect on the lever $k$ on account of the presence of the connecting rod $n'$ which then swings ineffectively about its fulcrum on the transverse arm of this lever, thereby rendering the adjusting device unsusceptible to lateral motions of the car body. The connecting rod $n'$ thus provides a non-thrust transmitting connection between the car body and the radial axle guiding structures in regard to transverse movements of the car body relatively to the truck frame.

In the embodiment shown in Fig. 3, the wheel-and-axle structures are again designated by $a$, one of which only being motor driven and the radial axle guiding structure of this driven wheel-and-axle structure being again formed by the common housing G of the motor $b$ and the gearing $i$, while the other radial axle guiding structure is formed by a frame-like radius rod $b'$.

The truck frame $e$ engages with the axles by means of bearings included in the circular axle boxes. If a fixed axle having loose wheels is used in conjunction with the radius bar $b'$ the latter is rigid with the axle and carries in addition the connecting bracket for the connection between the truck frame and the radius bar $b'$, which connection is immovable in any direction except vertically. The connections between the motor housing G and the radial axle guiding structure $b'$ on the one hand and the truck frame $e$ on the other hand are formed by triangular links $g$ of the kind described in connection with the first embodiment. Furthermore, both radial axles are loaded, that is, subjected to stress by the truck frame $e$ in a manner similar to that explained in connection with the first embodiment.

Various changes and modifications may be made in the constructive details without departing from the inventive idea and the scope of the appended claims is not to be considered as limited except as specified therein.

I claim:

1. In a rail vehicle having a motor truck provided with automatically adjusted radial axle guiding structures adapted to carry motor actuated axle driving means, a vehicle frame carrying the body of the vehicle, a truck frame, two of said axle guiding structures carried by said truck frame, a truck and body interlock pivotally supporting said vehicle frame on said truck frame centrally between the axles, means for elastically supporting said truck frame on said axles, connecting means immovably inter-connecting said truck frame and the outer ends of said structures except for vertical spring adjustments between said parts, a common adjusting device for said structures intercalated between said truck frame and the inner ends of said structures, and linking means interposed between said device and said vehicle frame positively influencing said device only in accordance with the longitudinal movements of said vehicle frame relatively to said truck frame, for preventing relative transverse movements of said frames from influencing said guiding structures.

2. In a rail vehicle having a motor truck provided with automatically adjusted radial axle guiding structures adapted to carry motor actuated axle driving means, a vehicle frame carrying the body of the vehicle, a truck frame, two of said axle guiding structures mounted on said truck frame, a truck and body interlock pivotally supporting said vehicle frame on said truck frame centrally between the radial axles, means for elastically supporting said truck frame on said axles, triangular links pivotally connected to said truck frame on a substantially horizontal axis and articulated to the outer ends of said structures, thereby being adapted to transmit the longitudinal and transverse tensions and thrusts acting between said truck frame and said structures, and prevented from being loaded by said truck frame, a common adjusting device for said structures intercalated between said truck frame and the inner ends of said structures resting against said frame, and linking means interposed between said device and said vehicle frame positively influencing said device only in accordance with the longitudinal movements of said vehicle frame relatively to said truck frame, for preventing relative transverse movements of said frames from influencing said guiding structures.

3. In a rail vehicle having a motor truck provided with automatically adjusted radial axle guiding structures adapted to carry motor actuated axle driving means, a vehicle frame carrying the body of the vehicle, a truck frame, two of said axle guiding structures mounted on said truck frame, a truck and body interlock pivotally supporting said vehicle frame on said truck frame centrally between the axles of said structures, cylindrical axle boxes providing bearings for said axles, stirrups having depending spring supporting ends suspended on said boxes, vehicle springs extending upwardly from said ends into engagement with said truck frame, paralleling devices guiding said stirrups in parallelism with their original position while said boxes roll on said stirrups in adaptation to radial adjustments of said axles, connecting means non-resiliently interconnecting said truck frame and the outer ends of said structures except for adjustments of said springs, a common adjusting device for said structures intercalated between said truck frame and the inner ends of said structures, and linking means interposed between said device and said vehicle frame positively influencing said device only in accordance with the longitudinal movements of said vehicle frame relatively to said truck frame, for preventing relative transverse movements of said frames from influencing said guiding structures.

4. In a rail vehicle having a motor truck provided with automatically adjusted radial axle guiding structures adapted to carry motor actuated axle driving means, a vehicle frame carrying the body of the vehicle, a truck frame, two of said axle guiding structures carried by said truck frame, a truck and body interlock pivotally supporting said vehicle frame on said truck frame centrally between the axles of said structures, cylindrical axle boxes providing bearings for said axles, stirrups having depending spring supporting ends suspended on said boxes, vehicle springs extending upwardly from said ends into engagement with said truck frame, a forked member for each of said stirrups vertically rockable on said truck frame and sustaining the respective stirrup in parallelism with its original position while said boxes roll on said stirrups in adaptation to radial adjustments of said axles, connecting means non-resiliently interconnecting said truck frame and the outer ends of said structures except for adjustments of said springs, a common adjusting device for said structures intercalated between said truck frame and the inner ends of said structures, and linking means interposed between said device and said vehicle frame positively influencing said device only in accordance with the longitudinal movements of said vehicle frame relatively to said truck frame, for preventing relative transverse movements of said frames from influencing said guiding structures.

MAX FREI.